Dec. 30, 1924.                              1,520,948
P. HEINZ
MACHINE FOR GRINDING PRECIOUS STONES
Filed Sept. 7, 1923         2 Sheets-Sheet 1

Inventor:
Philipp Heinz
by [signature]
Atty.

Dec. 30, 1924.  
P. HEINZ  
1,520,948  
MACHINE FOR GRINDING PRECIOUS STONES  
Filed Sept. 7, 1923  2 Sheets-Sheet 2
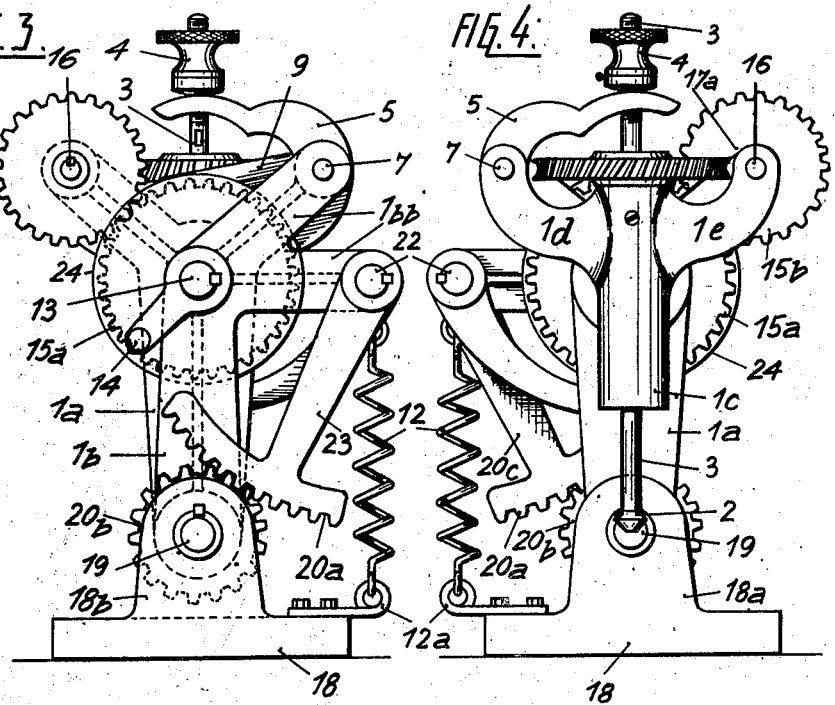
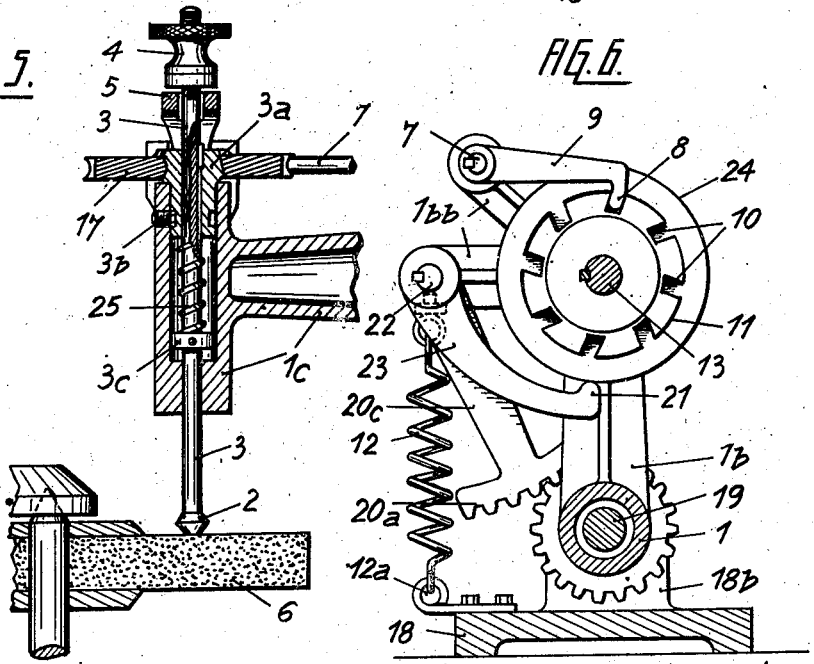
Inventor:  
Philipp Heinz  
by  
Atty.

Patented Dec. 30, 1924.

1,520,948

UNITED STATES PATENT OFFICE.

PHILIPP HEINZ, OF PFORZHEIM, GERMANY.

MACHINE FOR GRINDING PRECIOUS STONES.

Application filed September 7, 1923. Serial No. 661,526.

*To all whom it may concern:*

Be it known that I, PHILIPP HEINZ, a citizen of Germany, residing at 79, Kaiser-Friedrichstrasse, Pforzheim, Germany, have invented certain new and useful Improvements in Machines for Grinding Precious Stones, of which the following is a specification.

My invention relates to a machine for grinding precious stones and more especially to a machine in which the three adjustments required for the grinding are effected with the aid of a dividing plate and eccentrics in such a manner that the stone holder is turned by suitable gearing from one grinding position into the next one, the extent of the turning motion being limited and predetermined by means of an arresting device in combination with the dividing plate. The correct inclination of the grinding surfaces is obtained by an oscillation of the machine frame and the angle of inclination is determined by the end of a lever sliding on the circumference of an eccentric disk. The tool is held in operative position relatively to the grinding disk by a system of levers, and the movement of the stone toward the grinding disk is limited by a finger of a lever meeting either the circumference of an eccentric disk or the bottom of a recess in the dividing plate.

My improved machine is distinguished from those hitherto known in that instead of the templet plates or cylinders hitherto used and having holes co-operating with an adjusting pin serving to adjust the stone and introduced into the respective hole by three different crank arrangements, a dividing plate and one or two eccentric disks are used which are fixed to the same shaft and actuated by a crank in such a manner that the three adjustments of the stone required for grinding it follow each other automatically whereby the operation of the machine is facilitated and accelerated and the troublesome perforated templets are dispensed with. The machine is principally designed for quantity production, that is, for the grinding of simili or synthetic gems of identical size and shape. The condition for this is that the machine should perform its functions automatically so that no adjustment by hand is required when the machine has been set for grinding a gem of given size and shape.

In the drawings affixed to this specification and forming part thereof a grinding machine embodying my invention is illustrated diagrammatically by way of example.

In the drawings—

Figure 1 is a side view of the machine and

Figure 2 a horizontal section thereof.

Figures 3 and 4 are a rear view and a front view of the machine,

Figure 5 is a vertical section of the stone holder, and

Figure 1:
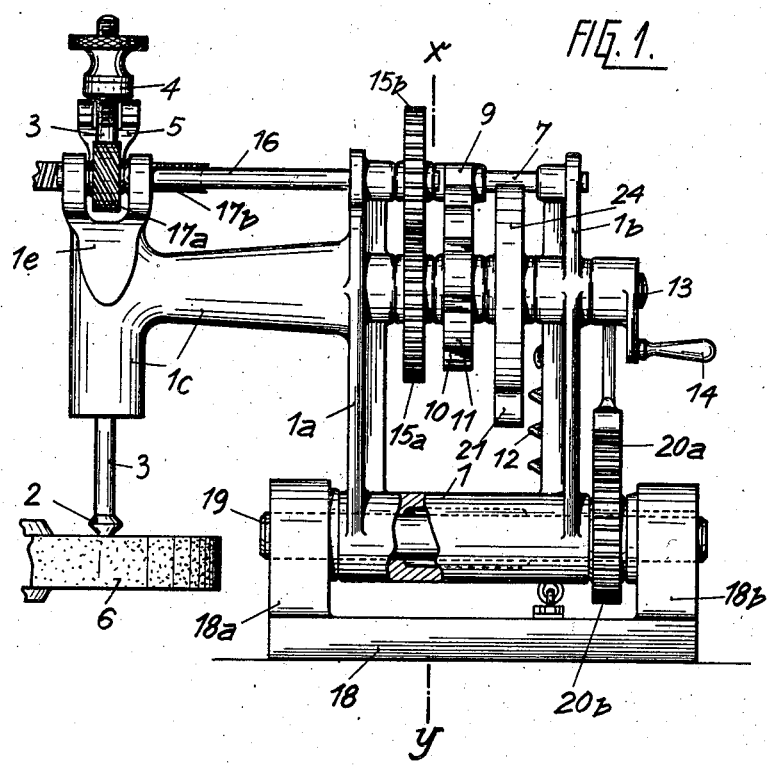

Figure 6 a vertical section in line $x$—$y$ of Fig. 1.

Referring to the drawings the base plate 18 is fitted with bearings $18^a$ and $18^b$ supporting a stationary spindle 19 about which a frame may swing. The frame consists of standards $1^a$ and $1^b$, a sleeve 1 connecting the standards at their lower ends, and an angular arm $1^c$ extending from the standard $1^a$. At its upper end the standard $1^b$ forms two arms $1^{bb}$ (Fig. 3), one of which extends horizontally, the other obliquely upwards.

Figure 2:
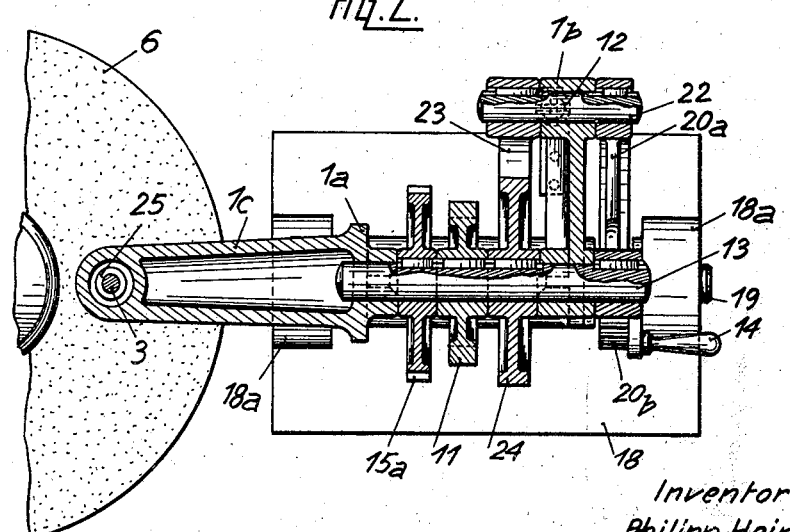

The two standards support a shaft 13 onto which are keyed a cog-wheel $15^a$, a disk 11 (Fig. 6) provided with notches 10, a disk 24 and a crank handle 14 (Figs. 1 and 2).

The horizontal arm 22 supports a short shaft $1^{bb}$ to which is secured a curved arm 23 (Fig. 6) extending down to below the disk 24 and having at its end a projection 21 bearing against the peripheral surface of the disk. To the other end of the shaft 22 is secured a downwardly extending arm $20^c$ forming at its free end a curved rack $20^a$ which meshes with a cog-wheel $20^b$ (Figs. 1 and 3) also supported on the spindle 19.

At the upper end of the vertical part of the arm $1^c$ there are arranged two arms $1^d$ and $1^e$ (Fig. 4), the upper ends of which form bearings for shafts 7 and 16, the first of which is supported at its other end in the upper end of the oblique arm $1^{bb}$ of the standard $1^b$. To the shaft 7 is fixed an arm 9 (Fig. 6) forming at its free end a finger 8 which co-operates with the notches 10 of the disk 11, and an arm or lever 5 (Figs 3 and 4), the free end of which is forked and extends below a nut 4 screwed onto a vertical spindle 3, to the lower end of which is secured the stone 2 to be ground (Figs. 1 and 5). 6 is the grinding disk.

The vertical part of the arm $1^c$ is hollow and supports with its upper end a sleeve 3ª coupled with the spindle 3 by feather and groove so that it can be shifted therein longitudinally. A worm-wheel 17ᵇ is firmly secured to the sleeve, this latter being prevented from moving axially by a screw 3ᵇ located in the arm 1ᶜ and engaging a circumferential groove of the sleeve. Below the sleeve there is disposed a spiral spring 25 which encompasses the spindle 3 and bears with its upper end on the sleeve and with its lower end on a collar 3ᶜ affixed to the spindle.

The arm 1ᵉ supports a shaft 16 which is arranged parallel to the shaft 7 and in the same horizontal plane, and has fixed to it a worm 17ª in gear with the worm-wheel 17ᵇ, and a cog-wheel 15ᵇ in gear with the cog-wheel 15ª of the shaft 13. Shaft 16 is shorter than shaft 7, in that it extends merely from the arm 1ᵉ to the standard 1ª and terminates at the cog-wheel 15ᵇ (Fig. 1).

A spiral spring 12 (Figs. 3, 4, and 6), is attached at 12ª to the base plate 18, and at its other end to the horizontal arm 1ᵇᵇ, the spring therefore tending to turn the frame 1, 1ª, 1ᵇ, 1ᶜ on the spindle 19.

The pressure with which the stone 2 is pressed onto the grinding disk 6 is determined by the tension of the spring 25 (Fig. 5).

The nut 4 on the upper end of the spindle 3 serves for adjusting the stone 2 relatively to the rotary grinding disk 6. It may be secured in its adjusted position by any suitable means for instance by a counter-nut.

The stone 2 is pressed onto the grinding disk by the spring 25 when the finger 8 of the arm 9 engages one of the notches 10 of the disk 11, but is kept off the grinding disk when said finger rests on one of the projections of the disk 11.

The disk 24 is either circular or slightly eccentric, and the degree of inclination of the frame 1, 1ª, 1ᵇ, 1ᶜ depends on the shape of this disk. Supposing it to be eccentric in accordance with the cut which the stone 2 shall have, the position of the arm 23, the end 21 of which bears on the circumference of the disk 24, will depend on the degree of eccentricity and on the position of the disk and the shaft 13, to which it is affixed. As arm 23 is firmly connected with the arm 20ᶜ, the toothed sector 20ª of which meshes with the stationary cog-wheel 20ᵇ, the position of the sector 20ª relatively to the cog-wheel 20ᵇ is also determined by the degree of eccentricity and the position of the disk 24, whereby the spring 12, which constantly tends to turn the frame 1, 1ª, 1ᵇ, 1ᶜ on the spindle 19, is prevented from turning the frame more than is necessary to cause the spindle 3 to assume the inclined position required for forming on the stone the ground surface. The disk 24 is maintained in its position by finger 8, disk 11, and shaft 13 which firmly connects the two disks with each other.

The spindle 3 is turned with the stone 2 as much as is required to grind another face by aid of the crank 14, the rotatory movement of which is transmitted to the spindle 3 by shaft 13, cog-wheels 15ª and 15ᵇ, shaft 16, and worm-gear 17ª, 17ᵇ.

The finger 8 of arm 9 varies its position relatively to the respective notch 10, its end being at a certain distance from the bottom of the notch when the grinding commences. As the grinding operation proceeds, the spindle 3 descends whereby the arm 5 is also lowered correspondingly. This movement is transmitted to the arm 9 by the shaft 7. The grinding of the surface under treatment is finished when the end of finger 8 touches the bottom of the respective notch 10.

The movement of the spindle 3 towards the grinding disk 6 is limited by the bottom surface of the notches whereas the projections or teeth separating them do not play any part in the adjustment of the stone and the disc 11 might be plain as far as that is concerned. But the notches 10 are required for the adjustment of the rotary gear. In the example illustrated, the dividing disk for the rotary gear and the disk for adjusting the stone to operative position are combined into a single member 11, but a separate dividing disk and a separate disk for the adjustment of the stone may be provided without departing from the spirit of my invention.

In order to allow changing at will the working position, as well as the number and inclination of the surfaces of the stone, the dividing disk 11 and disk 24 are easily exchangeable. Several dividing disks 11 and disks 24 may be arranged side by side on the shaft 15. In such a case the levers 9 and 23 must be adapted to be shifted along the shafts 7 and 22 so as to be adjustable relatively to the disks chosen in each individual case or a separate lever 9, or 23 respectively, must be provided for each disk, in which case it must also be possible to disengage the levers pertaining to the disks which are not required for the time being.

Means may further be provided which allow the machine to effect automatically, with the aid of auxiliary appliances and in their proper order the several adjustments required while the grinding of one or several surfaces is effected.

I wish it to be understood that I do not desire to be limited to the exact details of construction shown and described, for obvious modifications will occur to a person skilled in the art.

I claim:

1. Machine for grinding precious stones simili gems and the like, comprising a main frame, a grinding disc rotatably carried in said frame, means for rotating said grinding disc, a movable frame supported in said main frame, a stone holder supported in said movable frame and adapted to be turned and displaced therein, resilient means adapted to move said stone holder toward said grinding disc, mechanism for turning said stone holder, a dividing plate adapted to control said turning mechanism, and means operatively connected with said dividing plate for adjusting the position of said movable frame.

2. Machine for grinding precious stones, simili gems and the like, comprising a main frame, a grinding disc rotatably carried in said frame, means for rotating said grinding disc, a movable frame supported in said main frame, a stone holder supported in said movable frame and adapted to be turned and displaced therein, resilient means adapted to move said stone holder toward said grinding disc, mechanism for turning said stone holder, a dividing plate adapted to control said turning mechanism, a spring connected with said main frame and said movable frame and means operatively connected with said dividing plate for adjusting the position of said movable frame.

3. Machine for grinding precious stones, simili gems and the like, comprising a main frame, a grinding disc rotatably carried in said frame, means for rotating said grinding disc, a movable frame supported in said main frame, a stone holder supported in said movable frame and adapted to be turned and displaced therein, resilient means adapted to move said stone holder toward said grinding disc, mechanism for turning said stone holder, a dividing plate adapted to control said turning mechanism, a spring connected with said main frame and said movable frame, and a cam disc operatively connected with said dividing plate and adapted to adjust the position of said movable frame.

4. Machine for grinding precious stones, simili gems and the like, comprising a main frame, a grinding disc rotatably carried in said frame, means for rotating said grinding disc, a rocking frame supported in said main frame, a stone holder supported in said rocking frame and adapted to be turned and displaced therein, resilient means adapted to move said stone holder toward said grinding disc, mechanism for turning said stone holder, a dividing plate adapted to control said turning mechanism, a spring connected with said main frame and said rocking frame, a cam disc operatively connected with said dividing plate, a shaft rotatably carried in said rockable frame, an arm on said shaft adapted to engage said cam disc, a gear wheel held against rotation in said main frame, and a toothed segment on said shaft in said rockable frame adapted to mesh with said gear wheel.

5. Machine for grinding precious stones, simili gems and the like, comprising a main frame, a grinding disc rotatably carried in said frame, means for rotating said grinding disc, a movable frame supported in said main frame, a stone holder supported in said movable frame and adapted to be turned and displaced therein, resilient means adapted to move said stone holder toward said grinding disc, mechanism for turning said stone holder, a dividing plate and a cam disc operatively connected with one another and carried in said frame, said plate and said disc being adapted to adjust the position of said stone holder with regard to said grinding disc and the position of said movable frame with regard to said main frame.

In testimony whereof I affix my signature.

PHILIPP HEINZ.